United States Patent
Van Boven et al.

(10) Patent No.: US 10,451,792 B2
(45) Date of Patent: Oct. 22, 2019

(54) LIGHTING SYSTEM

(71) Applicant: SIGNIFY HOLDING B.V., Eindhoven (NL)

(72) Inventors: Jacobus Dingenis Machiel Van Boven, Eindhoven (NL); Berent Willem Meerbeek, Eindhoven (NL); Anthonie Hendrik Bergman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 359 days.

(21) Appl. No.: 15/121,398

(22) PCT Filed: Feb. 13, 2015

(86) PCT No.: PCT/EP2015/053036
§ 371 (c)(1),
(2) Date: Aug. 25, 2016

(87) PCT Pub. No.: WO2015/128201
PCT Pub. Date: Sep. 3, 2015

(65) Prior Publication Data
US 2016/0363710 A1    Dec. 15, 2016

(30) Foreign Application Priority Data

Feb. 28, 2014  (EP) .................................... 14157242

(51) Int. Cl.
*G02B 6/00*    (2006.01)
*F21V 8/00*    (2006.01)
(Continued)

(52) U.S. Cl.
CPC .............. *G02B 6/006* (2013.01); *F21S 8/026* (2013.01); *F21S 8/04* (2013.01); *F21S 10/02* (2013.01);
(Continued)

(58) Field of Classification Search
CPC .... G02B 6/006; G02B 6/0041; G02B 6/0068; G02B 6/0076; G02B 6/0061;
(Continued)

(56) References Cited

U.S. PATENT DOCUMENTS 3,124,311 A    3/1964   Kruger
7,481,550 B1   1/2009   Schreiber et al.
(Continued)

FOREIGN PATENT DOCUMENTS

CA         1112446 A1    11/1981
CN       201539722 U      8/2010
(Continued)

OTHER PUBLICATIONS

"The Artifical Sky", http://www.bartenbach.com/entlighting-design/the-artificial-sky.html.
(Continued)

*Primary Examiner* — Y M. Lee
(74) *Attorney, Agent, or Firm* — Daniel J. Piotrowski

(57) ABSTRACT

A lighting system comprising: a first controllable light source (11) configured to provide light in a first direction; a second electrically controllable light source (16) configured to provide light in a second direction; a support structure (14) comprising at least one region of light diffusing particles configured to diffuse light provided by the second electrically controllable light source such that at least a portion of the light provided by the second electrically controllable light source is output in the first direction and is mixed with the light provided by the first controllable light source.

11 Claims, 11 Drawing Sheets

(51) Int. Cl.
*F21V 33/00* (2006.01)
*F21S 8/04* (2006.01)
*F21S 10/02* (2006.01)
*F21S 8/02* (2006.01)
*F21V 14/00* (2018.01)
*F21Y 113/00* (2016.01)
*G09F 13/18* (2006.01)
*F21Y 115/10* (2016.01)

(52) U.S. Cl.
CPC .......... *F21V 14/003* (2013.01); *F21V 33/006* (2013.01); *G02B 6/0041* (2013.01); *G02B 6/0068* (2013.01); *G02B 6/0076* (2013.01); *F21V 2200/20* (2015.01); *F21Y 2113/00* (2013.01); *F21Y 2115/10* (2016.08); *G09F 2013/1886* (2013.01)

(58) Field of Classification Search
CPC ..... G02B 66/004; G02B 6/0073; F21S 8/026; F21S 8/04; F21S 10/02; F21V 14/003; F21V 33/006; F21V 2200/20; F21Y 2113/00; F21Y 2113/10; G09F 213/1886; G09F 13/04; G01D 11/28
See application file for complete search history.

(56) References Cited

U.S. PATENT DOCUMENTS

| | | | |
|---|---|---|---|
| 8,439,519 B2 | 5/2013 | Yang et al. | |
| 2008/0273323 A1 | 11/2008 | Ladstaetter | |
| 2009/0219734 A1* | 9/2009 | Sawada | G02B 6/006 362/616 |
| 2011/0025229 A1 | 2/2011 | Yeh et al. | |
| 2012/0105508 A1* | 5/2012 | Masuda | G02F 1/133615 362/602 |
| 2012/0134170 A1 | 5/2012 | Bracale | |
| 2012/0243256 A1* | 9/2012 | Lee | G02B 6/0023 362/609 |
| 2012/0320626 A1* | 12/2012 | Quilici | F21S 8/04 362/606 |
| 2013/0114292 A1 | 5/2013 | Brick et al. | |
| 2013/0301300 A1 | 11/2013 | Duerksen et al. | |

FOREIGN PATENT DOCUMENTS

| | | |
|---|---|---|
| CN | 202176982 U | 3/2012 |
| CN | 102734742 A | 10/2012 |
| CN | 103032761 A | 4/2013 |
| DE | 198437903 U1 | 5/1986 |
| DE | 19514649 A1 | 10/1996 |
| DE | 10021100 A1 | 11/2001 |
| DE | 10216645 A1 | 11/2003 |
| DE | 102010018033 A1 | 10/2011 |
| EP | 1555477 A1 | 7/2005 |
| JP | 2006501512 A | 1/2006 |
| JP | 2010015973 A | 1/2010 |
| JP | 2010129242 A | 6/2010 |
| JP | 2014026841 A | 2/2014 |
| WO | 2009156347 A1 | 12/2009 |
| WO | 2012140579 A2 | 10/2012 |
| WO | 2013011404 A2 | 1/2013 |
| WO | 2013011481 A2 | 1/2013 |
| WO | 2013057610 A1 | 4/2013 |
| WO | 2013061189 A1 | 5/2013 |
| WO | 2014030100 A1 | 2/2014 |

OTHER PUBLICATIONS

Franz Miller, Research News, Fraunhofer Press,ISSN 09 48-83 83. Virtual Sky Makes for Happier Workers, http://www.scienceagogo.com/news/20120003211400data_trunc_sys.shtml.

* cited by examiner

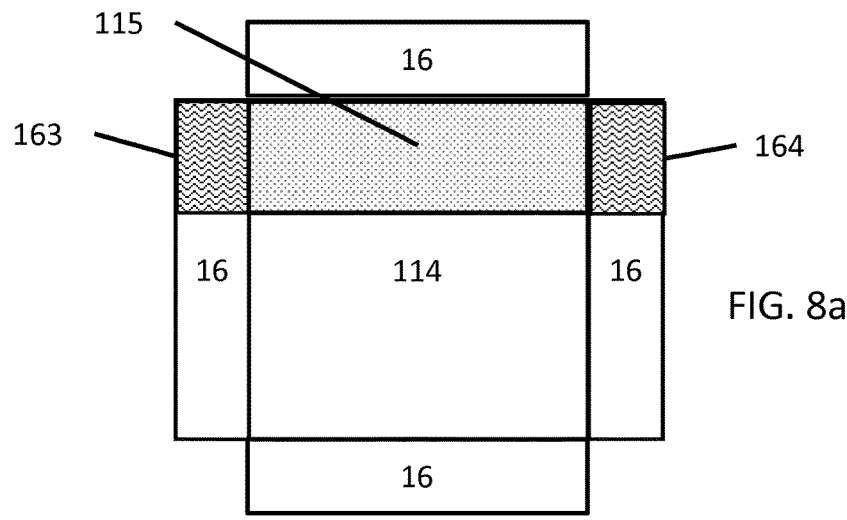
FIG. 8a
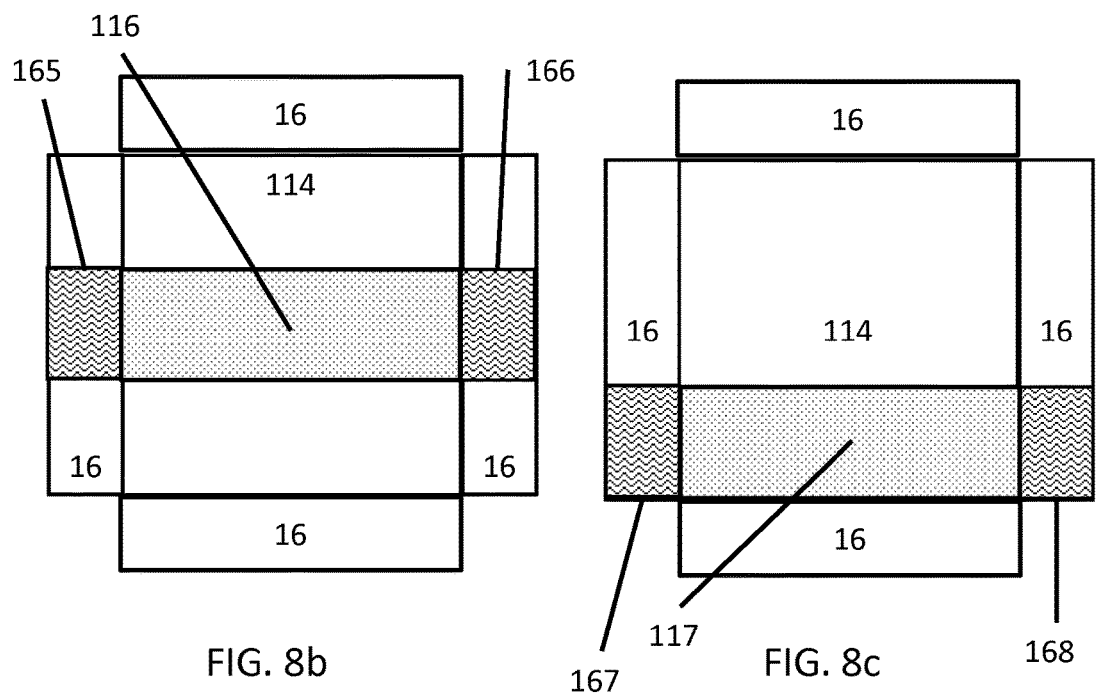
FIG. 8b
FIG. 8c

LIGHTING SYSTEM

CROSS-REFERENCE TO PRIOR APPLICATIONS

This application is the U.S. National Phase application under 35 U.S.C. § 371 of International Application No. PCT/EP2015/053036, filed on Feb. 13, 2015, which claims the benefit of European Patent Application No. 14157242.0, filed on Feb. 28, 2014. These applications are hereby incorporated by reference herein.

FIELD OF THE INVENTION

This invention relates to lighting systems, and specifically but not limited to interior artificial lighting systems.

BACKGROUND OF THE INVENTION

People generally prefer daylight over artificial light as their primary source of illumination. Everybody recognizes the importance of daylight in our daily lives. Daylight is known to be important for people's health and well-being.

In general, people spend over 90% of their time indoors, and often away from natural daylight. There is therefore a need for artificial daylight sources that create convincing daylight impressions with artificial light, in environments that lack natural daylight including homes, schools, shops, offices, hospital rooms, and bathrooms.

There has been significant development of lighting systems which try to emulate daylight even more faithfully. For example, such lighting systems are used as artificial skylights, which attempt to emulate natural daylight that would be received through a real skylight. To enhance the realism of the artificial skylight, the skylight solution is usually mounted in a recess in the ceiling, in the same way that a real skylight would be mounted.

It has been recognized that it would be desirable to enable the color temperature and variation to be selectable or even to evolve over time, so that the evolution of the color point of natural daylight can be emulated, or indeed a specific color point can be selected. Similarly it would be desirable to enable the color temperature to be variable over the light source to emulate the spatial variability of light color from a typical window or skylight. However, this requires a more complex light source and associated control system.

There is therefore a need for a light system which enables control of the color point and variation of color in a more efficient and cost effective manner.

SUMMARY OF THE INVENTION

The invention is defined by the claims.

According to the invention, there is provided a lighting system comprising:

a first controllable light source (11) configured to provide light in a first direction, a second electrically controllable light source (16) configured to provide light in a second direction, an optical element (12), and an edge lit light guide (14) comprising an out-coupling pattern on its surface and/or scattering particles or structures formed within its structure, wherein the optical element comprises a grid of hexagonal cells (15) wherein light emitted by the first controllable light source (11) within a threshold angle each side of the normal from the middle of each cell does not pass through a cell wall and thus is not processed, whereas light emitted at an angle greater than the threshold angle each side of the normal passes through a cell wall and is suitably processed, and wherein the second electrically controllable light source (16) is side coupled to the edge lit light guide (14), and wherein the edge lit light guide (14) is configured to diffuse light provided by the second electrically controllable light source (16) such that at least a portion of the light provided by the second electrically controllable light source (16) is output in the first direction and is mixed with the light provided by the first controllable light source (11).

In such a manner some embodiments can be implemented which feature controllable lighting mixing simulating or emulating a desired lighting effect.

The first controllable light source may be face coupled with the support structure and the second electrically controllable light source may be side coupled with the support structure.

In such embodiments the second electrically controllable light source light passes through the length or width of the support structure and therefore a significant proportion of the light is diffused or scattered into the first direction whereas the first controllable light passes through the depth of the support structure and therefore a significant proportion of the light passes unaffected.

The first controllable light source may be an intensity controllable light source.

The second electrically controllable light source may be an intensity controllable light source.

The second electrically controllable light source may be a color controllable light source.

The second electrically controllable light source may comprise an array of selectable light emitting elements arranged on at least part of the periphery of the support structure.

The array of selectable light emitting elements may be configured to provide a spatially controllable light source.

The selectable light emitting elements may be configured to generate at least two selectable collimated light beams and the support structure may comprise at least two respective regions of light diffusing particles, the regions of light diffusing particles shaped in a defined form, wherein the lighting system may be configured to generate an illuminated shape in the defined form based on the light provided by the second electrically controllable light source.

The support structure may comprise at least two layers of support structure, the at least two layers of support structure may comprise at least one respective region of light diffusing particles shaped in a defined form, and the second electrically controllable light source may comprise at least two layers of selectable light emitting elements, wherein a respective layer of selectable light emitting elements may be arranged on at least part of the periphery of an associated layer of the support structure, such that a selective activation of the at least two layers of selectable light emitting elements may be configured to selectively illuminate one of the shapes in a defined form.

The respective at least one part light diffusing particles may overlap in the first direction.

The lighting system may further comprise a controller configured to control the first controllable light source providing light in the first direction and the second electrically controllable light source providing light in the second direction.

According to a second aspect there is provided a method for providing a lighting system comprising: providing a first controllable light in a first direction; providing a second electrically controllable light in a second direction; and coupling the second electrically controllable light in the second direction to a support structure comprising at least one region of light diffusing particles configured to diffuse the second electrically controllable light such that at least a portion of the second electrically controllable light is mixed with the first controllable light and output in the first direction.

The method may further comprise coupling the first controllable light in the first direction to the support structure.

Providing the first controllable light may comprise providing an intensity controllable light.

Providing the second electrically controllable light in a second direction may comprise providing an intensity controllable light.

Providing the second electrically controllable light in a second direction may comprise providing a color controllable light.

Providing the second electrically controllable light may comprise selectively activating at least one light emitting element from an array of selectable light emitting elements arranged on at least part of a periphery of the support structure.

Selectively activating at least one light emitting element from an array of selectable light emitting elements arranged on at least part of a periphery of the support structure may comprise selectively illuminating at least one of at least two respective regions of light diffusing particles, the regions of light diffusing particles shaped in a defined form.

A non-transitory computer-readable medium containing a computer program may comprise computer program code means adapted to control a lighting system to perform all the steps of the methods as disclosed herein, if the program is run on the physical computing device coupled to the lighting system.

Selectively activating at least one light emitting element from an array of selectable light emitting elements arranged on at least part of a periphery of the support structure may comprise selectively illuminating at least one layer of at least two layers of the support structure.

The method may comprise controlling the first controllable light and the second electrically controllable light.

According to a third aspect there is provided a lighting system comprising: means for providing a first controllable light in a first direction; and means for providing a second electrically controllable light in a second direction; means for coupling the second electrically controllable light in the second direction to a support means comprising at least one region of light diffusing particles configured to diffuse the second electrically controllable light such that at least a portion of the second electrically controllable light is mixed with the light provided by the means for providing a first controllable light and output in the first direction.

The apparatus may further comprise means for coupling the first controllable light in the first direction to the support means.

The means for providing the first controllable light may comprise means for providing an intensity controllable light.

The means for providing the second electrically controllable light in a second direction may comprise means for providing an intensity controllable light.

The means for providing the second electrically controllable light in a second direction may comprise means for providing a color controllable light.

The means for providing the second electrically controllable light may comprise means for selectively activating at least one light emitting element from an array of selectable light emitting elements arranged on at least part of a periphery of the support structure.

The means for selectively activating at least one light emitting element from an array of selectable light emitting elements arranged on at least part of a periphery of the support structure may comprise means for selectively illuminating at least one of at least two respective regions of light diffusing particles, the regions of light diffusing particles shaped in a defined form.

The means for selectively activating at least one light emitting element from an array of selectable light emitting elements arranged on at least part of a periphery of the support structure may comprise means for selectively illuminating at least one layer of at least two layers of the support structure.

The lighting system may comprise means for controlling the means for providing the first controllable light and for controlling the means for providing the second electrically controllable light.

According to a fourth aspect there is provided a lighting system comprising at least one processor and at least one memory including computer code for one or more programs, the at least one memory and the computer code configured to with the at least one processor cause the apparatus to: provide a first controllable light in a first direction; and provide a second electrically controllable light in a second direction; couple the second electrically controllable light in the second direction to a support structure comprising at least one region of light diffusing particles configured to diffuse the second electrically controllable light such that at least a portion of the second electrically controllable light is mixed with the light provided by the first controllable light source and output in the first direction.

Providing the first controllable light may cause the apparatus to provide an intensity controllable light.

Providing the second electrically controllable light in a second direction may cause the apparatus to provide an intensity controllable light.

Providing the second electrically controllable light in a second direction may cause the apparatus to provide a color controllable light.

Providing the second electrically controllable light may cause the apparatus to selectively activate at least one light emitting element from an array of selectable light emitting elements arranged on at least part of a periphery of the support structure.

Selectively activating at least one light emitting element from an array of selectable light emitting elements arranged on at least part of a periphery of the support structure may cause the apparatus to selectively illuminate at least one of at least two respective regions of light diffusing particles, the regions of light diffusing particles shaped in a defined form.

Selectively activating at least one light emitting element from an array of selectable light emitting elements arranged on at least part of a periphery of the support structure may cause the apparatus to selectively illuminate at least one layer of at least two layers of the support structure.

BRIEF DESCRIPTION OF THE DRAWINGS

Examples of the invention will now be described in detail with reference to the accompanying drawings, in which:

FIGS. 8a, 8b, and 8c show an example of a lighting system providing controllable color lighting and variation producing dynamic spatial patterns in a single direction according to some embodiments;

DETAILED DESCRIPTION OF THE EMBODIMENTS

The concept as embodied in the description herein is a lighting system comprising a first controllable light source generating or providing light in a first direction; a second electrically controllable light source generating or providing light in a second direction; and an edge lit light guide comprising at least one region of light diffusing particles configured to scatter or diffuse light generated by the second electrically controllable light source such that at least a portion of the light generated by the second electrically controllable light source is output from the support structure in the first direction and is mixed with the light generated by the first electrically controllable light source.

Figures 1, 2:
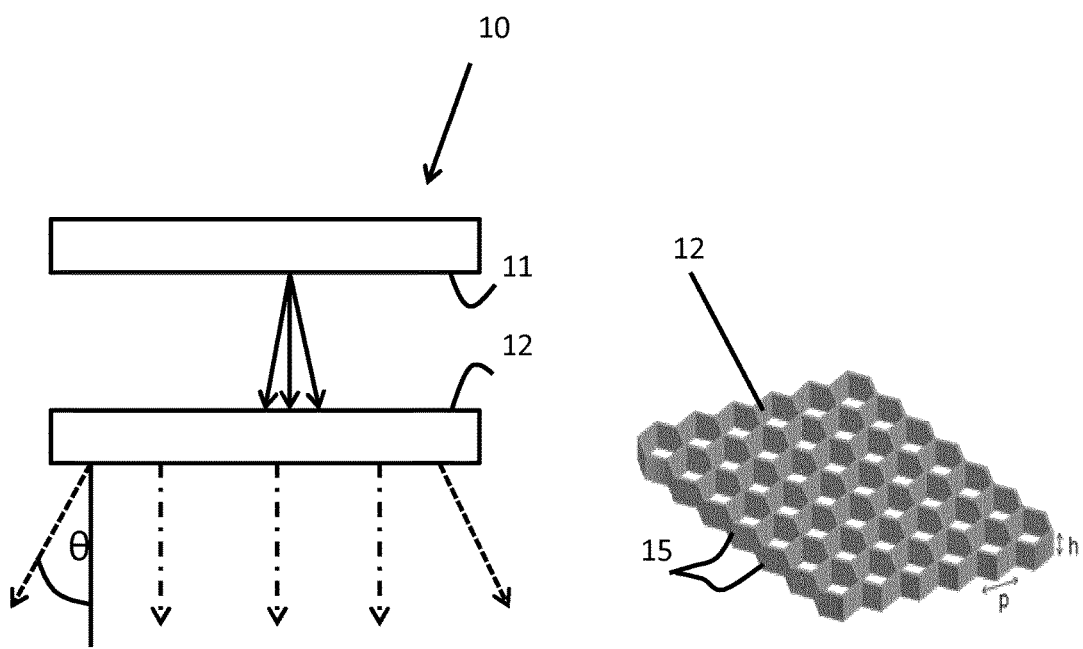
FIG. 1 shows a lighting system.
FIG. 2 shows an example of the structure of the optical element shown in the lighting system shown in FIG. 2.

FIG. 1 shows a lighting system 10, comprising a first (diffuse) light source 11, such as found in a luminaire, and an optical element 12 through which the output of the diffuse light source is processed and provided. The light source 11 has a planar exit window, which is typically mounted parallel to a surface in which the lighting system is mounted, and typically parallel to a horizontal ceiling. The first (diffuse) light source 11 can in some embodiments be a 'white' light source which is electrically controllable with respect to the intensity or strength of the illumination produced by the light source. In other words the first (diffuse) light source 11 may in some embodiments be a diffuse white light source with local dimming capability.

The optical element 12 can in some embodiments provide controllable differences in color between light directed in a normal direction (i.e. downward in the case of a ceiling mounted light source) and at an angle to the normal. The term "normal direction" is used in the mathematical context, as meaning perpendicular to plane of the light exit window. This is represented schematically in FIG. 1, by the different arrow types used to show normal light and angled light. The threshold angle mentioned above is shown in FIG. 1 as θ, and it may be 35 degrees. For light emitted within this angle each side of the optical element can permit the light to pass without processing, outside of the angle each side of the optical element processes the light passing through it.

FIG. 2 shows an example of the structure of the optical element 12. The structure of the optical element in some embodiments is a grid of hexagonal cells 15. Thus for light emitted within the threshold angle each side of the normal from the middle of the cell the light does not pass through a cell wall and thus is not processed, whereas light greater than the threshold angle each side of the normal would pass through cell wall and be suitably processed. For example the cell wall can act as a color filter and/or intensity filter.

The cells 15 as shown in FIG. 2 lie in a plane parallel to the light source 11. In some embodiments the cells are a fixed color. For example in some embodiments the cells have walls with a fixed sky blue color. It would be understood that in some embodiments the cells within the grid can have fixed colors but also differ in color through the grid. For example to provide a fixed but varied color distribution across the grid.

However it would be understood that in some embodiments the cells have a cell wall formed as an electrically switchable element which is switchable between at least two processing modes. Each cell wall surrounds an opening, such that light emitted in a normal direction from the light source 11 is not processed, and light passing at an angle to the normal direction greater than the threshold angle must pass through the cell wall.

The steepest angle of light which is not processed can be defined between one edge of the light source and a diametrically opposite cell wall. This angle can be considered to be the angle which determines if the threshold angle is reached, since all light steeper than this angle must pass through a cell side wall.

The grid typically can have a height, h, of 1 to 15 mm and a cell pitch, p, of 1 to 10 mm, and the grid can be hexagonal as shown, but it may instead be any suitable shape for example circular, square or rectangular. Furthermore although the grid is shown as being a regular grid it would be understood that the grid may in some embodiments comprise differently shaped or sized cells, in other words the grid is an irregular grid.

The cell pitch and height are chosen so that light from a center of the cell, and within a first range of angles to the normal direction, passes through the central area of the grid cells, such as 0 to 35 degrees, whereas steeper light, from 35 to 90 degrees, passes through the cell walls. The cell wall design can be chosen to make the task light narrower (e.g. 25 degrees) or wider.

The cell walls of the structure shown in FIG. 2 can in some embodiments be structured as an in-plane electrophoretic device—with the plane extending in the direction normal to the exit window. Thus, particle movement in the plane is then upwardly or downwardly.

In some embodiments the arrays of electrophoretic cells can be controlled with all cells controlled in the same way, or with cells grouped into a relatively small number of segments.

These figures are not drawn to scale. In particular, they are drawn much wider to make the structure clear. This means the ray directions are not meant to be accurate.

The lighting system 10 as shown in FIG. 1 is configured such that it can be used to generate a processed 'sky' appearance in combination with white direct light in the room.

Figure 3:
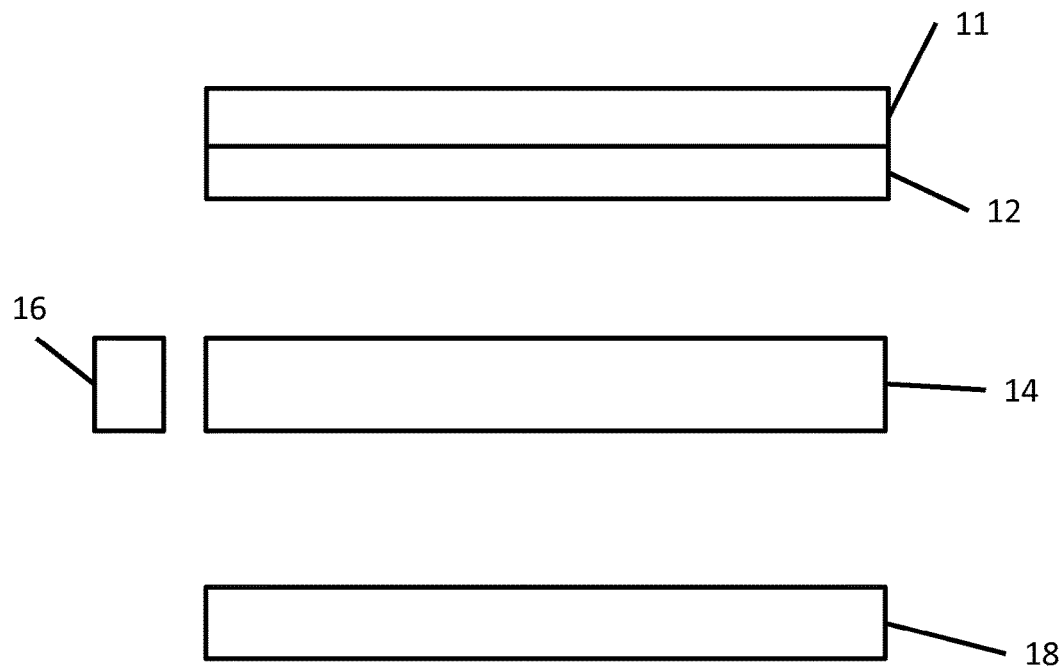
FIG. 3 shows an example of a lighting system providing controllable color lighting according to some embodiments.

With respect to FIG. 3 an example of the structure of the lighting system according to some embodiments is shown. The lighting system comprises the diffuse light source 11 and an optical element 12 through which the output of the diffuse light source can be provided in manner similar to that shown in FIGS. 1 and 2.

Furthermore the lighting system structure can in some embodiments further comprise an edge lit light guide 14. The edge lit light guide 14 is shown separate from the diffuse light source 11 and optical element 12 however in some embodiments the edge lit light guide physically (or mechanically) supports the diffuse light source 11 and optical element 12 and as such is in contact with at least one of the diffuse light source 11 and the optical element.

The edge lit light guide 14 may comprise at least one region or part or segment within which are located light diffusing particles or light scattering particles. The light diffusing particles or light scattering particles scatter any light which is introduced into the structure. An example of a material suitable for implementing the light diffusing particle structure can be found for example by Tvonik' in their 'Endlighten' product. The edge lit light guide can be any suitable shape or configuration. In the examples described herein the edge lit light guide has a square or rectangular shape of which the length and width of the structure are significantly greater than the depth of the structure. The edge lit light guide 14 or light mixing structure is configured such that light coupled at one of the ends (the smaller sides of the structure) of the structure and passing through the length or width of the structure (in other words along a 'long' dimension of the structure) is more likely to be diffused or scattered than light coupled to a face (the larger sides) and passing through the depth of the structure (in other words along a 'short' dimension of the structure).

The edge lit light guide 14 is therefore configured in such a manner that light from the diffuse light source 11 and the optical element 12 (in other words the first light source) are coupled to the face of the support structure and pass through the edge lit light guide 14 along the depth dimension of the structure and as such where the light passes through a light diffusing region a significant portion of the light is not scattered or diffused.

The lighting system structure can, in some embodiments, further comprise at least one end/side emitting light source 16, in other words a second light source configured to emit light in a second direction (a direction in some embodiments other than the diffuse light source 11 direction). In some embodiments the side emitting light source(s) 16 comprise light emitting diodes (LED). These light emitting diodes can be any suitable technology diodes. In some embodiments the light emitting diodes are red, green, blue (RGB) diode light elements, white diode light elements, or white-RGB diodes.

In the example shown in FIG. 3 the side emitting light source 16 is located on one side of the edge lit light guide 14 only. However it would be understood that the side emitting light source 16 can be located on the whole of the periphery of the edge lit light guide 14, or only partially along the periphery of the edge lit light guide 14.

The side emitting light source 16 is in some embodiments configured to be coupled to one of the ends (a small area side) of the edge lit light guide 14 such that light passes along the length (or width) of the edge lit light guide 14. The light diffusing particles within the edge lit light guide 14 can therefore scatter or diffuse a large proportion of the light from the side emitting light source(s) 16 as it passes the length or width of the structure. The scattered light from the side emitted light sources can furthermore be scattered into the same or similar direction to the first light source 11 light direction (in other words a portion of the light is scattered 'downwards').

In some embodiments at least one surface of the edge lit light guide 14 can be configured to reflect unscattered or light scattered in a direction other than that desired back into the edge lit light guide. For example in some embodiments the upper surface or the ends of the edge lit light guide 14 may be coated or polished to permit reflection back into the edge lit light guide to occur thus increasing the efficiency of the light diffusing particles in producing light in the desired 'downwards' direction.

In some embodiments the lighting system structure can further comprise a diffuser layer 18 located in the general first direction along the desired light pathway and configured to diffuse or lightly scatter the light emitted from the edge lit light guide 14 in the first direction.

Figure 4:
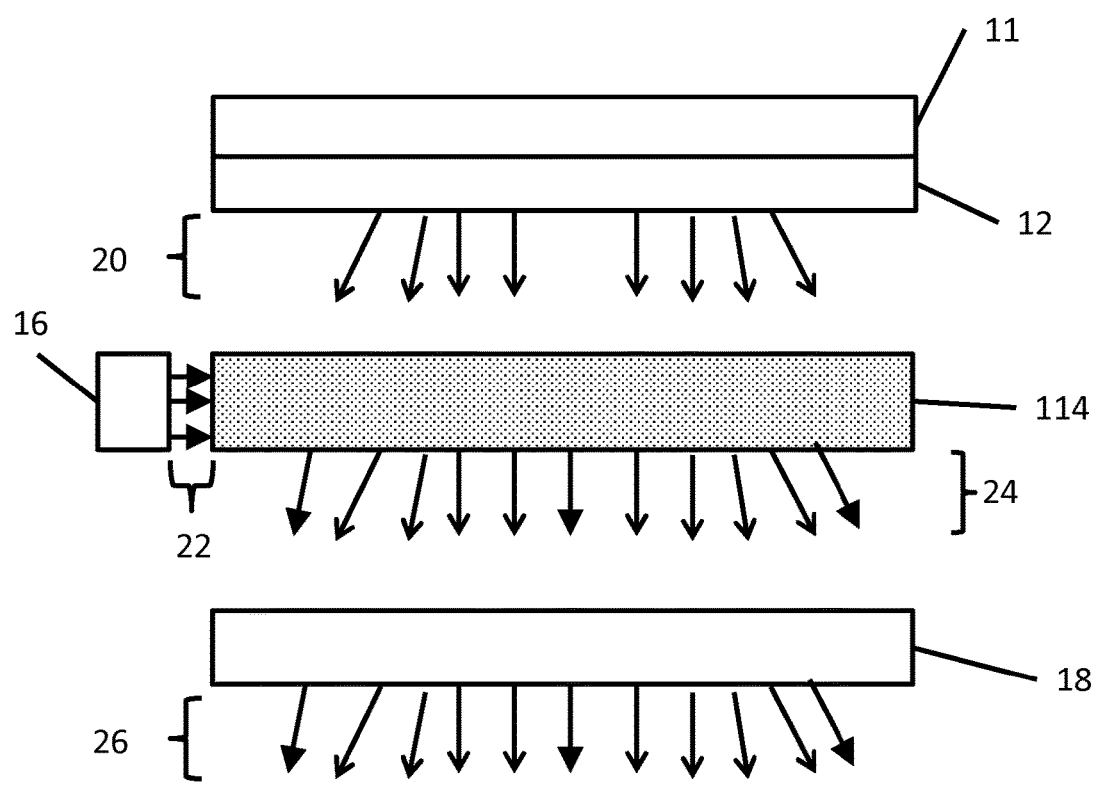
FIG. 4 shows the operation of the example lighting system shown in FIG. 3 when the side coupled lights are activated.
Figure 5:
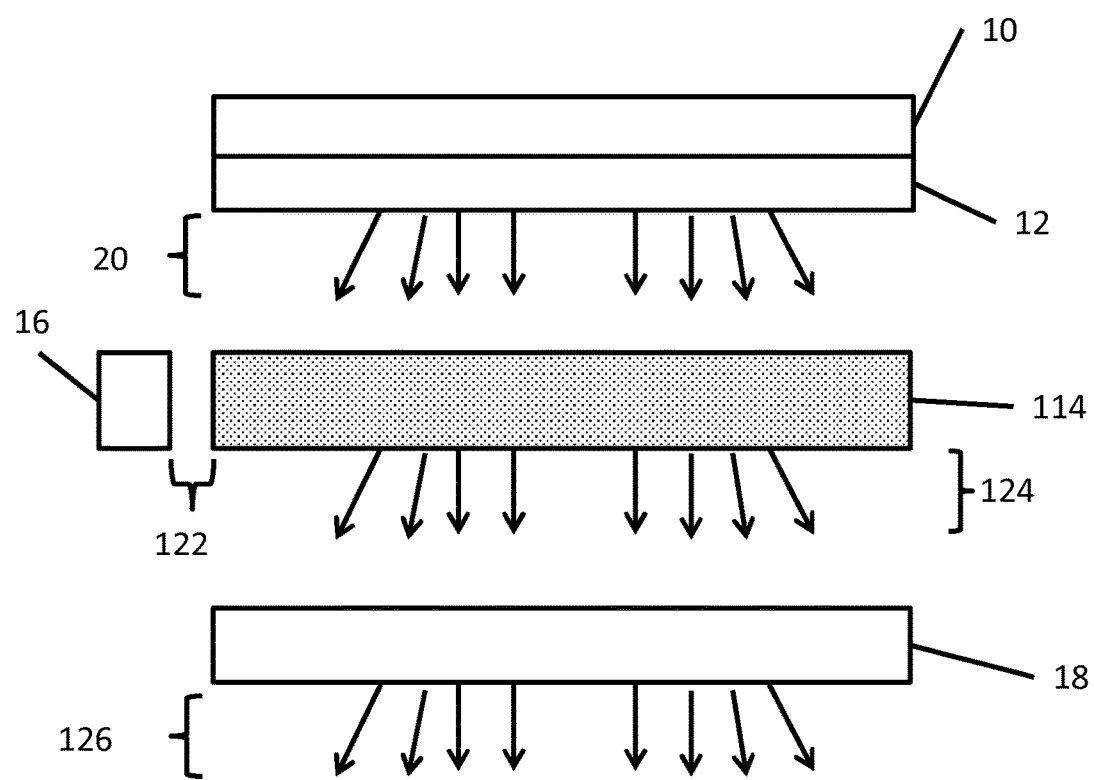
FIG. 5 shows the operation of the example lighting system shown in FIG. 3 when the side coupled lights are deactivated.

With respect to FIGS. 4 and 5 the operation of the example lighting system structure shown in FIG. 3 is described according to some embodiments.

With respect to FIG. 4 the operation of the lighting system is shown when the side emitting light source 16 is active. Furthermore in the example shown in FIG. 4 the edge lit light guide 14 is completely formed from light diffusing particle material. The edge lit light guide thus in FIGS. 4 and 5 is a light diffusing structure 114.

As described herein the diffuse lighting source 11 and the optical element 12 are configured to produce diffuse lighting. This diffuse lighting is shown in FIG. 4 by the hollow head arrows 20. This diffuse lighting 20 passes through the light diffusing particle structure 114 depth (small or short) dimension and as such very little scattering or further diffusion of light occurs. Therefore a significant portion of the light which enters through a first face of the light diffusing particle structure 114 (the upper or top face) is output on the opposite face (the lower or bottom face).

Furthermore the side emitting light source 16 generates or emits light which is coupled with the light diffusing particle structure 114, shown in FIG. 4 by the solid head arrows 22. The light from the side emitting light source 16 passes along the length (or width) of the light diffusing particle structure 114 and a portion of this light is diffused or scattered in a direction or directions such that some of the light exits the light diffusing particle structure 114 through the same face and in a direction similar to the diffuse or first light source light. This can be seen in FIG. 4 by the arrows 24 comprising both solid head arrows and the hollow head arrows. This combination of diffused or scattered side emitted light and the diffuse light 24 can then in some embodiments further pass through the weak diffuser layer 18 and produce a combined or mixed output light 26.

This combined or mixed output light 26 can be for example contrasted with the diffuse light source light only output light 126 shown in FIG. 5 where the side emitting light source 16 in inactive or deactivated. In this example there is an absence or no light 122 coupled between the side emitting light source 16 and the light diffusing particle structure 114 and therefore the output from the light diffusing particle structure 114 is substantially light which is generated by the diffuse light source 11 and the optical element 12. This light diffusing particle structure diffuse only light 124 passes through the weak diffuser layer 18 and output as diffuse light source light only output light 126.

Although the examples shown with respect to FIGS. 4 and 5 show a 'switched on' and 'switched off' side emitting light source operation. It would be understood therefore that by adjusting the light levels or intensity and/or the light colors from the side emitting light source 16 that the output light can be varied between a combined or mixed light output 26 and diffuse light source only output 126.

In such a way the light levels can be changed in a number of ways to create various experiences or effects. One of such experiences could be to set the side emitting light source 16 to a fixed 'orange' light level. Furthermore the intensity of the diffuse white light source 11 can, in some embodiments, be electrically controlled to initially outshine the orange light but by gradually decreasing the light intensity of the diffuse light source the relative contribution of the orange light increases. In such a manner an effect of a sunset may be emulated by the embodiments described herein.

In some further embodiments an effect of a sunrise may be emulated by reversing the process such that by gradually increasing the light intensity of the diffuse light source the relative contribution of the orange light decreases.

In some embodiments the intensity of the diffuse white light source 11 may be changed as well as the intensity of the side emitting light source 16 or in some embodiments only the intensity of the side emitting light source 16 is changed to produce the difference in relative contribution between the 'orange' side emitting light source(s) 16 and the 'white' diffuse light source 11.

A further effect which could be created according to some embodiments is to configure the side emitting light source(s) 16 to emit a white light in such a way that the light of the diffuse (white) light source 11 is initially greater than the white light produced from the side emitting light source(s) 16. In such embodiments by gradually decreasing the light level of the diffuse light source the relative contribution of the side emitting light source is increased and the appearance of the blue sky produced by the optical elements is gradually replaced by the white of the side emitting light sources scattered by the light diffusing particle support structure as well as the total light level of the lighting system decrease. The effect as described herein may emulate a passing cloud covering the direct sunlight. In some embodiments it would be understood that the effect may be generated by changing the relative light levels of the diffuse (white) light source as well as the light intensity of the side emitting light source(s).

In some embodiments the side emitting light source 16 is configured in an array structure of lighting elements. These lighting elements (which may in some embodiments be individually addressable LED modules or lights) may be arranged along the periphery of the edge lit light guide, for example the light diffusing particle structure 114. The arrangement of the side emitting light sources and their addressability can permit the generation of controlled spatial variation or patterns in the output light and furthermore permit dynamic spatial patterns in the output.

For example FIGS. 8a to 8c show an example linear spatial progression as an emulated cloud passes over the light system. FIGS. 8a to 8c show a plan view of the lighting structure from the viewpoint of being 'underneath' the lighting system. Furthermore the examples shown herein show the side emitting light source(s) 16 as an array of four addressable columns/rows of lights each of which is coupled to a respective side of a square light diffusing particle structure 114. In the following description the side emitting light source(s) are identified by 'upper', 'middle', 'lower' adjectives to specify a part of the light sources. However it would be understood that these are relative terms only to clarify the orientation and operation of the example lighting system and do not limit the orientation of the lighting system in general.

With respect to FIG. 8a a first pair of opposite located side emitting light source portions 163, 164 located on an 'upper' third of the pair of side emitting light sources are activated at a first time. The side emitting light source portions 163, 164 light is scattered or diffused over a first region 115 of the light diffusing particle structure 114 located between the two opposite located side emitting light source portions which outputs a higher intensity and mixed light output, whereas the remainder of the light diffusing particle structure 114 has an light output defined by the diffuse light source 11 area.

At a second time FIG. 8b shows the progression of the pattern where a second pair of opposite located side emitting light source portions 165, 166 are activated. The second pair of opposite located side emitting light source portions 165, 166 is located on a 'middle' third of the pair of side emitting light sources. The second pair of side emitting light source portions 165, 166 light is scattered or diffused over a second region 116 of the light diffusing particle structure 114 located between the two opposite located side emitting light source portions which outputs a higher intensity and mixed light output, whereas the remainder of the light diffusing particle structure 114 has an light output defined by the diffuse light source 11.

At a third and further time FIG. 8c shows the final stage of the pattern started in FIG. 8a where a third pair of opposite located side emitting light source portions 167, 168 are activated. The third pair of opposite located side emitting light source portions 167, 168 is located on a 'lower' third of the pair of side emitting light sources. The third pair of side emitting light source portions 167, 168 light is scattered or diffused over a third region 117 of the light diffusing particle structure 114 located between the two opposite located side emitting light source portions which outputs a higher intensity and mixed light output, whereas the remainder of the light diffusing particle structure 114 has an light output defined by the diffuse light source 11.

By generating the events shown in FIGS. 8a, 8b, and 8c in order an effect of a bright light passing over the lighting system from the upper to lower portions of the lighting system is emulated.

Figure 9A:
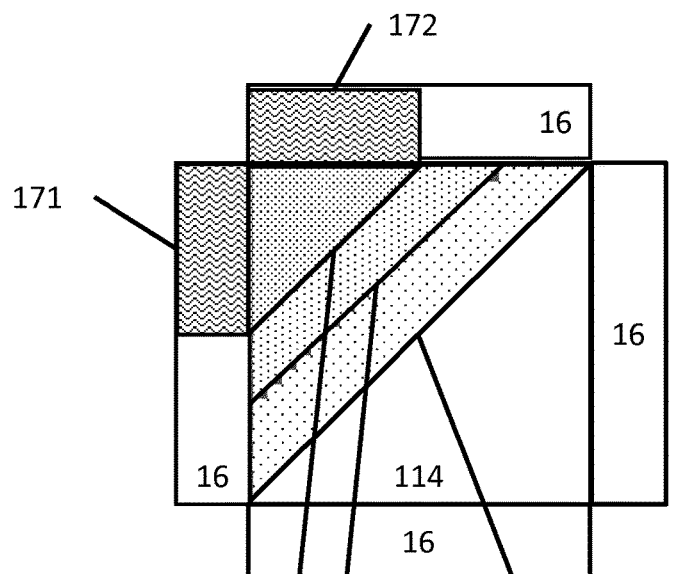
FIGS. 9a, 9b, and 9c show an example of a lighting system providing controllable color lighting and variation producing dynamic spatial patterns in two directions according to some embodiments.
Figures 9B, 9C:
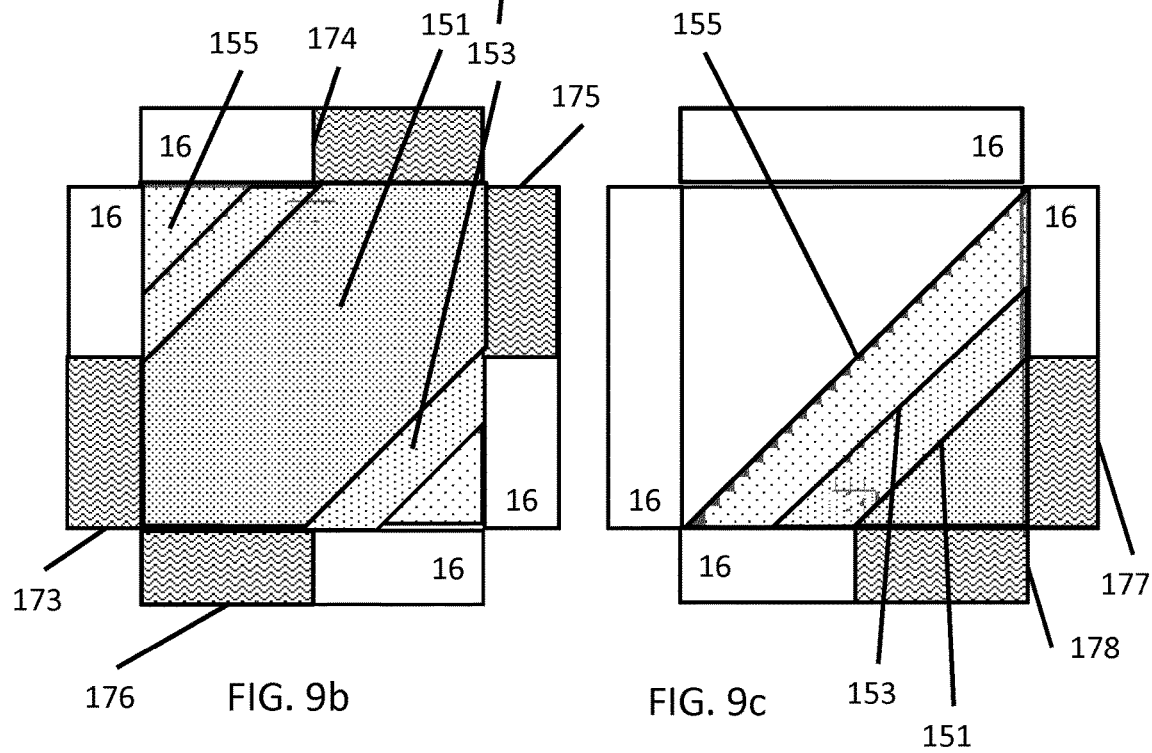

FIGS. 9a to 9c show an example of a lighting system within which a diagonal lighting effect is produced. The effect to be produced is one where the light diagonally passes from a first corner of the light system to the opposite corner of the light system. This example shows the effect of co-ordination between more than a pair of side emitting light source lighting elements. FIGS. 9a to 9c show a plan view of the lighting structure from the viewpoint of being 'underneath' the lighting system. Furthermore the examples shown herein show the side emitting light source 16 as an array of four addressable columns of lights each of which is coupled to a respective side of a square light diffusing particle structure 114. In the following description the side emitting light source(s) are identified by 'left', 'right', 'top' and 'bottom' adjectives to specify a part of the light sources. However it would be understood that these are relative terms only to clarify the orientation and operation of the example lighting system and do not limit the orientation of the lighting system in general.

In the example shown in FIG. 9a the side emitting light source lighting elements towards the first corner (for the example shown in FIG. 9a a 'top left' corner) of the light diffusing particle structure 114 are active. These are a pair of side emitting light source portions 171, 172. The first portion

171 is a 'top' part of the 'left' block of the light emitting source 16. The second portion 172 is the 'left' part of the 'top' block of the light emitting source 16. The effect of the emitted light is such that the emitted light is scattered or diffused with a greatest or highest intensity over a primary region 151 of the light diffusing particle structure 114 roughly defined as the triangular area with two sides defined by the side emitting light source portions 171, 172 lengths, and less intense regions shown by a secondary region 153 which is adjacent the primary region 151, and tertiary region 155 which is adjacent to the secondary region 153 as the light from the side emitted lights is scattered along the length of the light path and thus an intensity of scattered or diffused light decreases as the light passes through the light diffusing particle structure 114.

In the example shown in FIG. 9b the side emitting light source lighting elements half-way between the first corner (for the example shown in FIG. 9a a 'top left' corner) and the second opposite corner (the 'bottom right' corner) of the light diffusing particle structure 114 are active. These are a two pairs of side emitting light source portions 173, 176, and 174, 175. The first pair can for example be a first portion 173 located at 'bottom' part of the 'left' block of the light emitting source 16 and a second portion 176 located at the 'left' part of the 'bottom' block of the light emitting source 16. The second pair can for example be a first portion 174 located at 'right' part of the 'top' block of the light emitting source 16 and a second portion 175 located at the 'top' part of the 'right' block of the light emitting source 16.

The effect of the emitted light is such that the emitted light is scattered or diffused with a greatest or highest intensity over the primary region 151 of the light diffusing particle structure 114 roughly defined as the diagonal band defined by the lines joining the side emitting light source portions, and less intense regions shown by secondary regions 153 which are either side of the primary region 151, and tertiary regions 155 which are adjacent to the secondary regions 153 as the light from the side emitted lights is scattered along the length of the light path and thus an intensity of scattered or diffused light decreases as the light passes through the light diffusing particle structure 114.

FIG. 9c shows where the side emitting light source lighting elements towards the second corner (for the example shown in FIG. 9c the 'bottom right' corner) of the light diffusing particle structure 114 are active. These are a pair of side emitting light source portions 177, 178. The first portion 177 is a 'bottom' part of the 'right' block of the light emitting source 16. The second portion 178 is the 'right' part of the 'bottom' block of the light emitting source 16. The effect of the emitted light is such that the emitted light is scattered or diffused with a greatest or highest intensity over the primary region 151 of the light diffusing particle structure 114 roughly defined as the triangular area with two sides defined by the side emitting light source portions 177, 178 lengths, and less intense regions shown by the secondary region 153 which is adjacent the primary region 151, and tertiary region 155 which is adjacent to the secondary region 153 as the light from the side emitted lights is scattered along the length of the light path and thus an intensity of scattered or diffused light decreases as the light passes through the light diffusing particle structure 114.

The effects shown in the examples FIGS. 8a to 8c, and 9a to 9c show stepwise changes in the generated effect as the light emitting elements are switched on and off along the light emitting source 16. However it would be understood that in some embodiments the effect can be a gradual or continuously variable change as the light intensity is changed gradually or slowly along the light emitting source (s) 16. For example with respect to FIG. 8a the lighting elements at the top or upper third of the 'left' and 'right' light emitting sources 16 are gradually increased to a maximum intensity. Then the middle third of the 'left' and 'right' light emitting sources 16 are gradually increased to a maximum intensity, as the top third 'left' and 'right' light emitting sources 16 are gradually decreased to a minimum intensity. Then the bottom third of the 'left' and 'right' light emitting sources 16 are gradually increased to a maximum intensity, as the middle third 'left' and 'right' light emitting sources 16 are gradually decreased to a minimum intensity. In such a manner a gradual effect change can be produced.

In such a way it can be possible to produce dynamic cloud effects as well as dynamic sunset or sunrise effects. Furthermore in some embodiments by producing the spatial patterns as shown herein it can be possible to produce local dimming or locally dimmed areas.

In some embodiments a region, area or portion of the edge lit light guide is transparent or substantially transparent and a different region, area or portion of the edge lit light guide is the light diffusing particle structure arranged in a defined form or shape. In such embodiments the activation of the side emitting light source(s) 16 can illuminate the light diffusing particle structure region or part to produce an illuminated shape.

Figure 6:
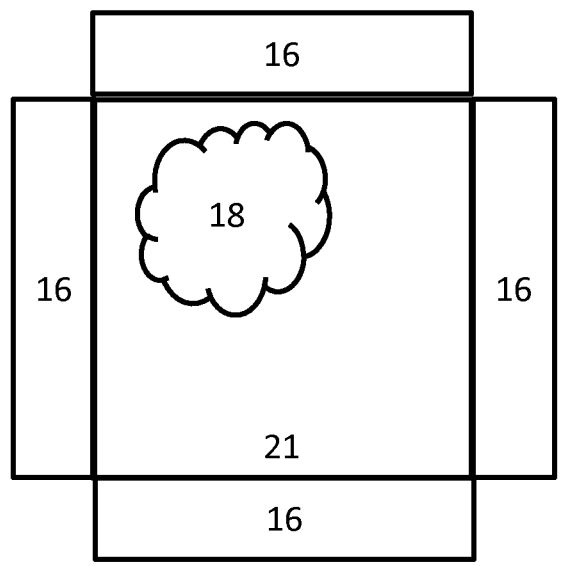
FIG. 6 shows an example of a lighting system providing controllable color lighting and variation using a defined shape according to some embodiments.

For example FIG. 6 shows a light guide 21 of which a portion is transparent and a cloud shaped portion 18 is the light diffusing particle part. When the side emitting light source(s) is switched on or active then the light diffused or scattered within the cloud shaped portion causes the cloud shape to 'appear' as a brighter or differently colored portion of the light source whereas when the side emitting light source is switched off then the cloud shape 'disappears'.

It would be understood that in some embodiments where the side emitting light source(s) comprise switchable elements then more than one shape can be illuminated either at the same or different times.

Figure 7:
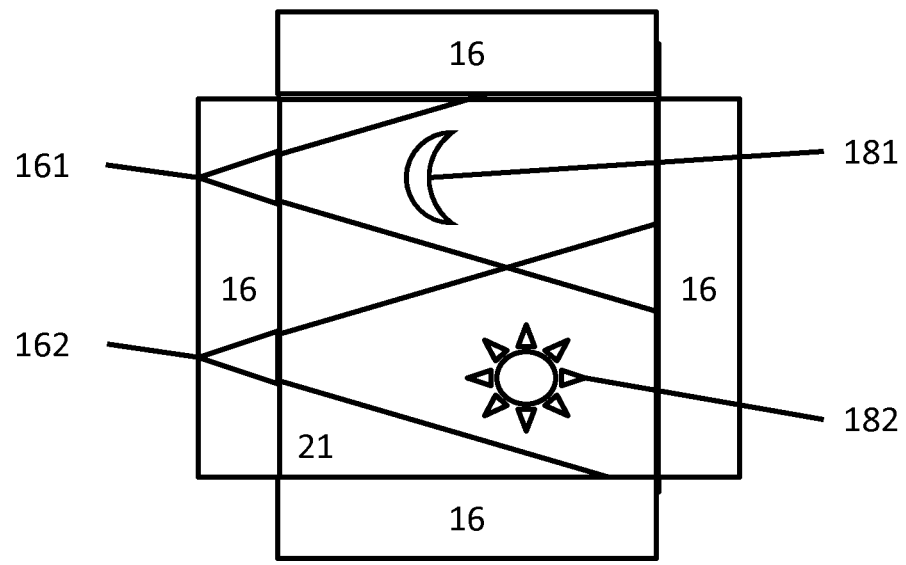
FIG. 7 shows an example of a lighting system providing controllable color lighting and variation using two switchable defined shapes.

For example, FIG. 7 shows an example wherein a light guide 21 comprises a first region of light diffusing particle material with a defined 'crescent moon' shape 181, and a second region of light diffusing particle material with a defined 'sun' shape 182. The side emitting light source 16 in this example comprises at least one collimated light element 161 configured to illuminate the first region and therefore the first shape 181 and a second light element 162 configured to illuminate the second region and therefore the second shape 182. By switching on or off, or varying the intensity of the first 161 and/or second 162 collimated light elements within the side emitting light source(s) 16 then the individual shapes can be illuminated separately or together. For example during the day the 'sun' shape 181 is illuminated, and during the night the 'moon' shape 182 is illuminated to provide a day/night effect.

Although the examples shown herein show a single layer of edge lit light guide it would be understood that in some embodiments multiple layers of edge lit light guide can be employed.

In such embodiments the layers of edge lit light guide can be individually controlled such that more sophisticated effects can be generated. For example multiple layers of edge lit light guide can be employed to produce images which comprise elements which otherwise would otherwise overlap and could not be separately illuminated on a single layer of support structure.

Figure 10A:
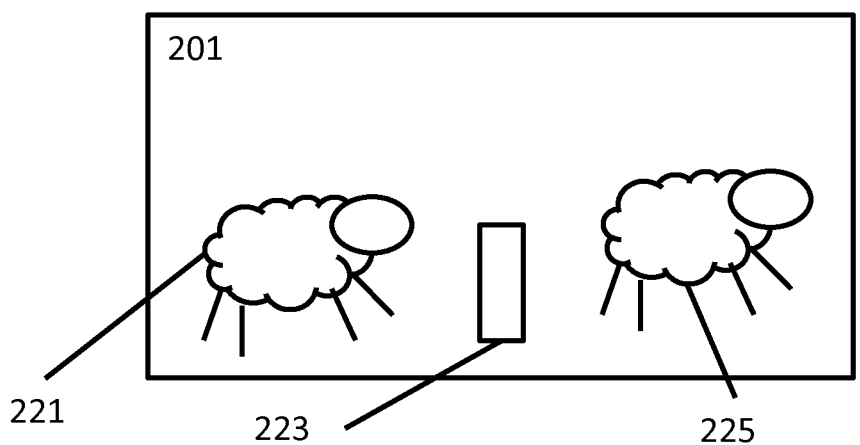
FIGS. 10a to 10d show an example of a lighting system providing controllable color lighting and variation producing dynamic spatial patterns using multiple light diffusing layers according to some embodiments.
Figure 10B:
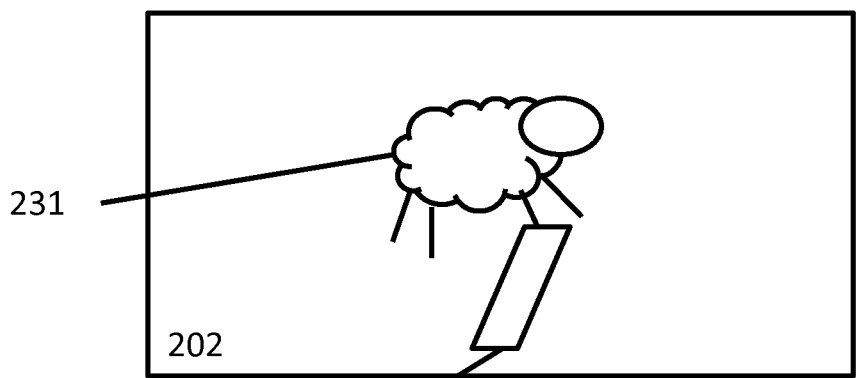
Figure 10C:
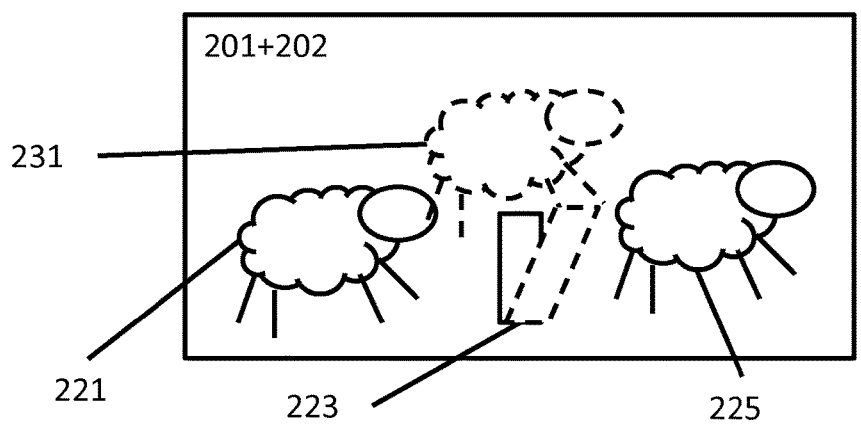
Figure 10D:
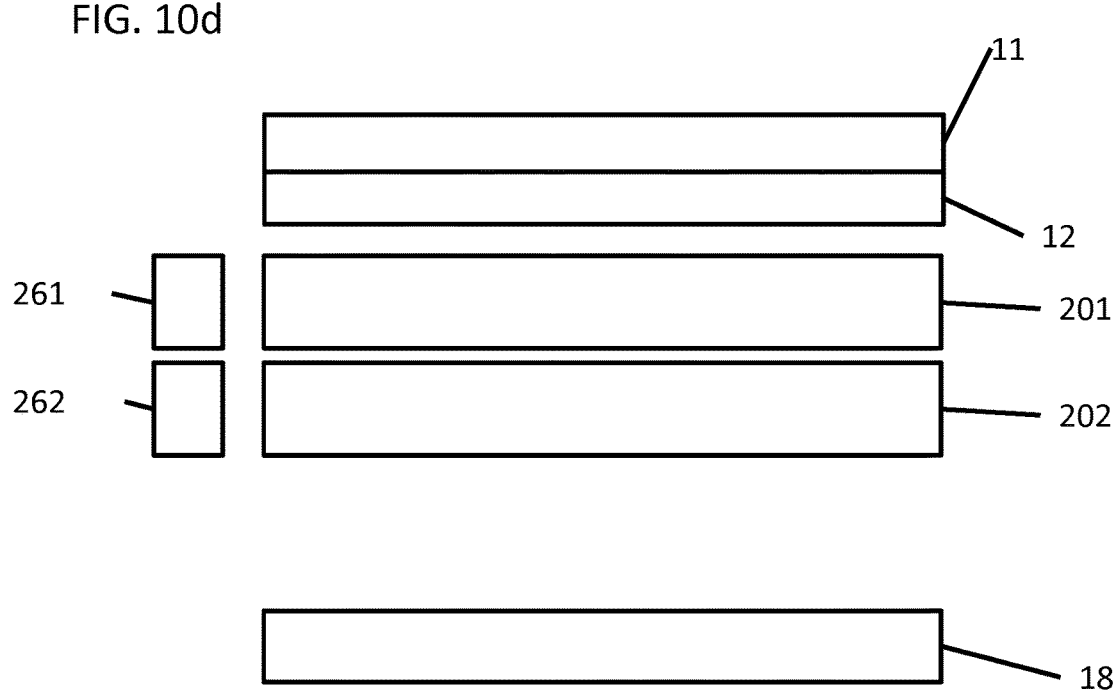

For example FIGS. 10a to 10d show an example multiple (two) layer structure. The example two layer structure shown in FIGS. 10a to 10d is configured to generate an animation effect to be produced by sequentially lighting up defined shaped regions of the light system. FIGS. 10a to 10c show a plan view of the lighting structure from the viewpoint of being 'underneath' the lighting system, whereas FIG. 10d shows a schematic side elevation view showing the two separate layers within the multiple layer support structure.

The example light guide shown in FIGS. 10a to 10d show a light guide comprising a first layer 201. The first layer 201 is furthermore configured to be coupled to a first layer side emitting light source 261. The first layer 201 is shown in FIG. 10a with a light guide having regions of light diffusing particles comprising 'left' sheep 221, 'right' sheep 225 and a fence 223 located between the 'left' and 'right' sheep regions. The light guide further comprises a second layer 202. The second layer 202 is furthermore configured to be coupled to a second layer side emitting light source 262. The second layer 202 is shown in FIG. 10b with a light guide having regions of light diffusing particles comprising 'jumping' sheep 231, and a clipped or sloped fence 233 located underneath the 'jumping' sheep region 231.

The combination of the example multiple layers of light guide are shown in FIG. 10c which shows the illumination of the first layer 201 by solid lines and overlayered by the second layer 202 by dashed lines. In this example an effect of sheep jumping and clipping a fence can be produced by illuminating the first layer 201 (by switching on the first layer side emitting light source 261) to illuminate the 'left' sheep shape and the fence (as well as an exiting 'right' sheep shape), illuminating the second layer (by switching on the second layer side emitting light source 262) to illuminate the 'jumping' sheep shape and 'clipped' fence shape (while switching the first layer side emitting light source 261 off), and then illuminating the first layer 201 again by switching back on the first layer side emitting light source 261 to illuminate the 'right' sheep shape and the fence (as well as a new 'left' sheep shape) while switching the second layer side emitting light source 261 off Furthermore the overlapping fence and clipped fence shapes are able to be displayed independently.

Although this example is shown with respect to a two layer configuration it would be understood that any suitable number of layers of light guides or plates with diffusing particles and associated coupled side emitting light sources can be employed.

Thus, for example, in some embodiments a light guide may comprise a first layer with coupled white side emitting light sources to create a cloudy sky appearance. The light guide furthermore may comprise a second layer with coupled red green blue (RGB) side emitting light source configured to mimic a sunset or sunrise effect. The light guide also may comprise a third layer comprising a light guide with various cloud shaped regions of light diffusing particles coupled to a third side emitting light source, the cloud shaped regions configured to become visible as the third side emitting light source is switched on.

It would be understood that in some embodiments that there can be fewer light source layers than light guide layers, for example a white light source layer and a RGB light source layer coupled to more than one light guide layer. Furthermore in some embodiments there can be more light source layers than light guide layers, for example a single light guide layer can be coupled to a first white light source layer and a second RGB light source layer and switching between the two can generate a 'white' effect or a 'colored; effect. Furthermore in some embodiments to avoid efficiency losses due to Fresnel reflections by multiple layers the RGB and white light sources or modules can be coupled into a single acrylic layer.

It would be understood that in some embodiments the lighting system can be implemented where the diffuse light source is switched off or substantially dimmed such that the output lighting effect is produced by the side emitting light source diffused by the light diffusing particle structure only. This effect may be known as a 'night mode'. In such embodiments the side emitting light source may be configured to produce a 'low level' basic diffuse white light or in some embodiments where the light guide comprises regions of light diffusing particles in the form of spots or star shapes or the light guide comprises a low density of light diffusing particles an effect of stars/milky way/galaxies in a dark sky could be produced.

Figure 11:
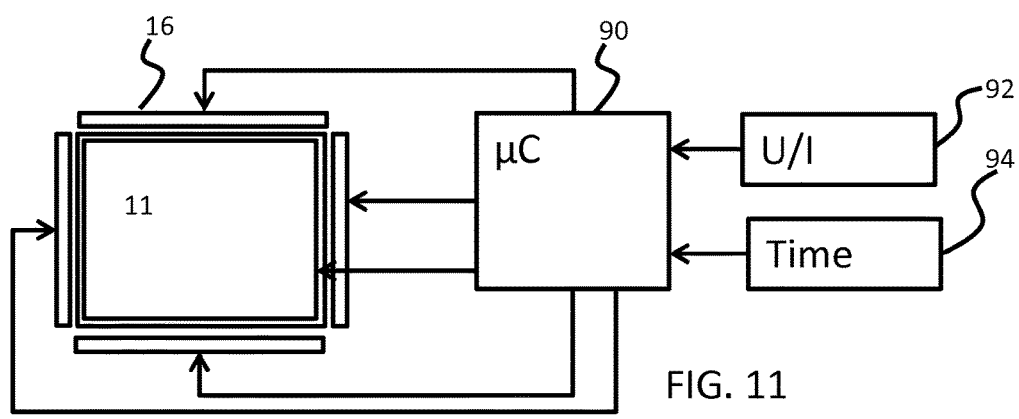
FIG. 11 shows the lighting system according to some embodiments with an associated controller.
Figure 12:
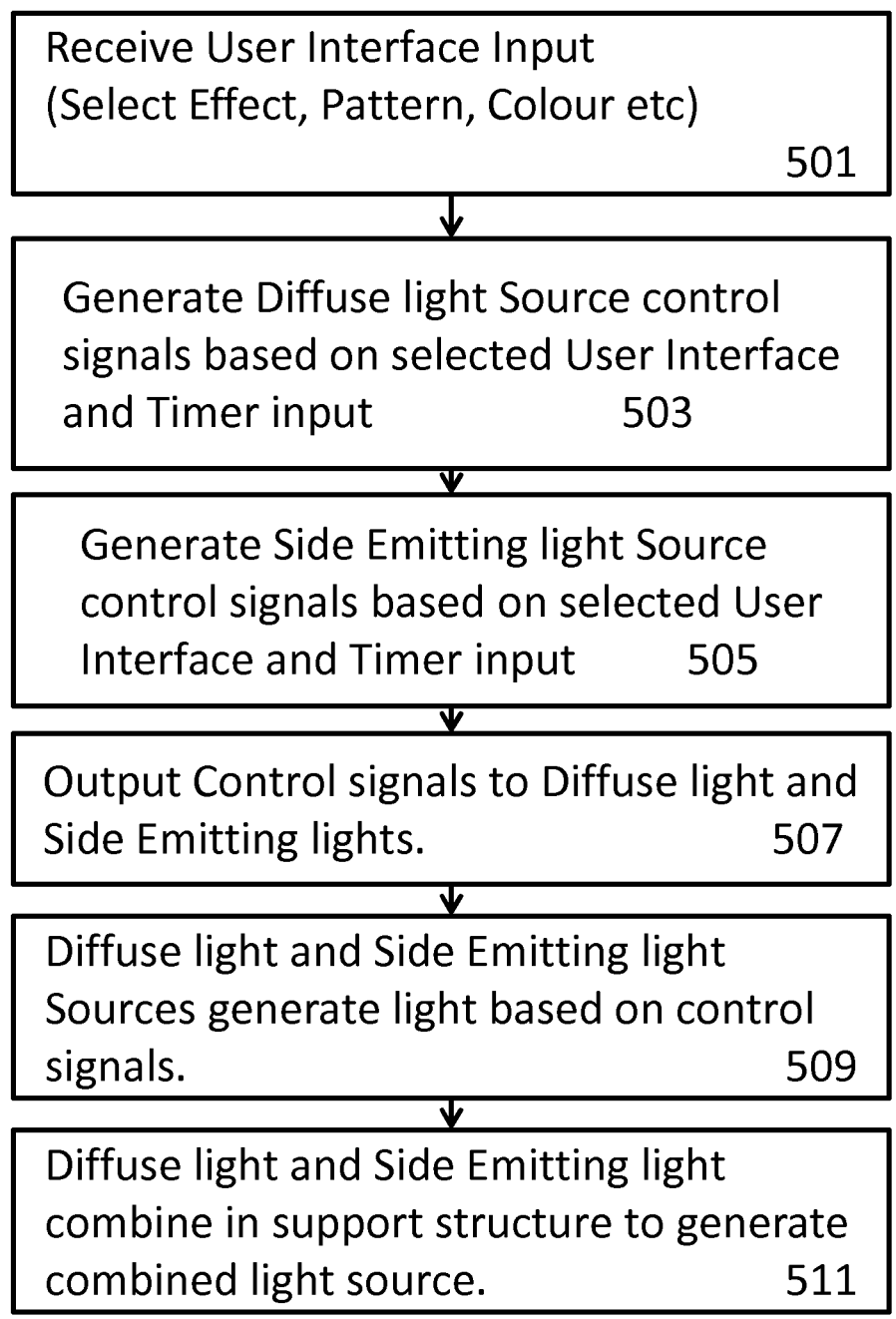
FIG. 12 shows a flow diagram of the operation of the lighting system with the associated controller to generate a suitable lighting effect such as shown in FIGS. 6 to 11.

FIG. 11 shows a system suitable for implementing embodiments of the invention. Furthermore FIG. 12 shows a flow diagram of the operation of the system as shown in FIG. 12. A controller 90 controls the diffuse (first) light source 11 as well as the side emitting light source(s) 16. The controller 90 can be configured to operate according to user instructions received from a user interface 92 and/or based on a time value received from a timer 94 so that sun rise and sun set control can be provided automatically. The controller 90 furthermore can be configured to enable changes in the light output of the light source. It would be understood that other sensors may be employed to allow the processor to generate effects such as emulating a cloud passing when a sensor located outside the building in which the lighting system is employed detects a temporary lowering of light levels.

Thus for example the controller 90 can be configured to receive a user interface input instruction from the user interface. An example of which could be an instruction to implement a defined effect 'sunrise', 'sunset' or pattern 'light sweep', or color 'orange light'.

The operation of receiving a user interface input is shown in FIG. 12 by step 501.

The controller can then be configured to generate a white or diffuse light source control signal or signals based on the selected user interface input and in some embodiments other sensor or timing information. For example the timer input to control the change of intensity of the diffuse light control signal.

The operation of generating the diffuse light source control signals is shown in FIG. 12 by step 503.

The controller can then be configured to generate a side emitting light source control signal or signals based on the selected user interface input and in some embodiments other sensor or timing information. For example the controller can in some embodiments use the timer input to control the change of intensity of the side emitting light control signal and the addresses to apply the control signal to produce the dynamic lighting effects shown in FIGS. 8 to 10.

The operation of generating the side emitting light source control signals is shown in FIG. 12 by step 505.

The controller can then in some embodiments be configured to output the control signals to the diffuse light source and the side emitting light source(s).

The operation of outputting the control signals to the diffuse light source and/or the side emitting light source(s) is shown in FIG. 12 by step 507.

The diffuse light source and/or the side emitting light source(s), having received the control signals from the controller can be configured to generate or provide light based on the control signals.

The operation of generating or providing light based on the control signals is shown in FIG. 12 by step 509.

The light from the diffuse light source and the side emitting light source(s) is then mixed or combined in the light guide (or light diffusing particle regions) to generate the controlled light output.

The operation of outputting a combined light is shown in FIG. 12 by step 511.

The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

In some embodiments all four side walls of the light guide are coupled to side emitting light sources configured to emit light homogenously over their entire surface. This means each side emitting light source consists of a single rectangular light emitting segment that can be switched on or off or can be dimmed to a value between 0% and 100% of the maximum light intensity.

Again, in some embodiments all of the side emitting light sources can be configured to be switched on simultaneously. This configuration does not replicate directional illumination from the sun, but does mean that the effect generated can have a controlled appearance, such as color.

As a first example, the side emitting light source light source(s) can comprise an edge lit light guide with an out-coupling pattern on its surface (such as paint dots, or surface roughness) or scattering particles or structures formed within its structure. The side emitting light sources furthermore can in some embodiments be LEDs at one or more edges of a light guide structure.

As a second example, the light source can be an OLED (organic LED) lighting panel.

As a third example, the light source can consist of an array of low or medium power LEDs in a white mixing box. The mixing box is covered by a diffuser to create a homogeneous emitting surface.

The examples above all relate to the use of the lighting system in combination with an artificial skylight, namely a lighting panel used to replicate the appearance of light as would be received from a ceiling window. In some implementations the artificial skylight is intended to replicate the appearance of a daytime illumination through a skylight (i.e. a window facing the sky). This appearance can include direct directional sunlight or it may be more diffuse to replicate an overcast day. The artificial skylight may also be controllable to replicate moonlight or starlight.

The arrangement of the invention can also be applied to real skylights (i.e. actual windows), wherein the controllable first light source can in some embodiments be provided by a controllable skylight. This lighting system can then be used during cloudy days to create an effect of a sunnier day, or at night to add to the general lighting.

The examples above make use of segmented light source areas. In some embodiments the side emitting light sources may be formed as a pixelated display with a much higher resolution, so that almost continuously varying patterns may be formed to improve even further the realism.

As discussed above, an area of particular interest is for artificial skylights. However, it should be clear from the description above that the invention also benefits in simulating the effect of sunlight in the case of a real window (skylight or standard vertical window) by creating a bright area on the window frame recess during a cloudy day. This creates the effect of direct sunlight (and a perception that it is less cloudy). This is most effective if the occupant cannot directly see out of the window, for example because he/she is sitting at a large angle or large distance.

Some embodiments can be applied to an artificial vertical window. The artificial window has a light source that attempts to create a realistic looking view (e.g. picture-like) or gives the (subconscious) impression of a real view (e.g. a very blurred low detail view, possibly with dynamics). Just like for a real window, the realism increases by simulating the effect of direct sunlight.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

The invention claimed is:

1. A lighting system comprising:
a first controllable light source configured to provide light in a first direction,
a second electrically controllable light source configured to provide light in a second direction,
an optical element, and
an edge lit light guide comprising an out-coupling pattern on its surface and/or scattering particles or structures formed within its structure,
wherein the optical element comprises a grid of hexagonal cells wherein light emitted by the first controllable light source within a threshold angle each side of the normal from the middle of each cell does not pass through a cell wall and thus is not processed, whereas light emitted at an angle greater than the threshold angle each side of the normal passes through a cell wall and is suitably processed, and wherein the second electrically controllable light source is side coupled to the edge lit light guide, wherein the edge lit light guide is configured in such a manner that light from the first controllable light source and the optical element are coupled to the edge lit light guide and pass through the edge lit light guide along the depth dimension of the edge lit light guide and a significant portion of the light emitted by the first controllable light source is not scattered or diffused, wherein the edge lit light guide is configured to diffuse light provided by the second electrically controllable light source such that at least a portion of the light provided by the second electrically controllable light source is output in the first direction and is mixed with the light provided by the first controllable light source;

wherein the second electrically controllable light source comprises an array of selectable light emitting elements arranged on at least part of the periphery of the edge lit light guide; and wherein the selectable light emitting elements generate at least two selectable collimated light beams and the edge lit light guide comprises at least two respective regions of light diffusing particles, the regions of light diffusing particles shaped in a defined form, wherein the lighting system is configured to generate an illuminated shape in the defined form based on the light provided by the second electrically controllable light source mixed with the light provided by the first electrically controllable light source.

2. A lighting system according to claim 1 wherein the grid of hexagonal cells provide controllable differences in color between light emitted by the first controllable light source in a normal direction, that is to say perpendicular to the plane of the light exit window, and light emitted by the first controllable light source at an angle to the normal.

3. The lighting system as claimed in claim 1, wherein the first controllable light source is face coupled with the optical element and the second electrically controllable light source is side coupled with the edge lit light guide.

4. The lighting system as claimed in claim 1, wherein the first controllable light source is an intensity controllable light source.

5. The lighting system as claimed in claim 1, wherein the second electrically controllable light source is at least one of:
   an intensity controllable light source;
   a color controllable light source.

6. The lighting system as claimed in claim 1, wherein the array of selectable light emitting elements arranged on the at least part of the periphery of the edge lit light guide is configured to provide a spatially controllable light source.

7. The lighting system as claimed in claim 1,
   wherein the edge lit light guide comprises at least two layers of edge lit light guide, the at least two layers of edge lit light guide comprise at least one respective region of light diffusing particles shaped in a defined form, and the second electrically controllable light source comprises at least two layers of selectable light emitting elements, wherein a respective layer of selectable light emitting elements is arranged on at least part of the periphery of an associated layer of the edge lit light guide, such that a selective activation of the at least two layers of selectable light emitting elements is configured to selectively illuminate one of the shapes in a defined form.

8. The lighting system as claimed in claim 7, wherein the respective at least one part light diffusing particles overlap in the first direction.

9. The lighting system as claimed in claim 1, further comprising a controller configured to control the first controllable light source providing light in the first direction and the second electrically controllable light source providing light in the second direction.

10. A method for providing a lighting system comprising:
    providing a first controllable light in a first direction;
    processing the first controllable light with an optical element comprising a grid of hexagonal cells wherein the first controllable light within a threshold angle each side of the normal from the middle of each cell does not pass through a cell wall and thus is not processed, whereas light emitted at an angle greater than the threshold angle each side of the normal passes through a cell wall and is suitably processed;
    providing a second electrically controllable light in a second direction;
    coupling the second electrically controllable light in the second direction to an edge lit light guide comprising at least one region of light diffusing particles configured to diffuse the second electrically controllable light such that at least a portion of the second electrically controllable light is mixed with the first controllable light from the optical element and output in the first direction;
    wherein providing the second electrically controllable light comprises selectively activating at least one light emitting element from an array of selectable light emitting elements arranged on at least part of a periphery of the edge lit light guide;
    wherein the selectable light emitting elements generate at least two selectable collimated light beams and the edge lit light guide comprises at least two respective regions of light diffusing particles, the regions of light diffusing particles shaped in a defined form, wherein the lighting system is configured to generate an illuminated shape in the defined form based on the light provided by the second electrically controllable light source mixed with the light provided by the first electrically controllable light source.

11. A non-transitory computer-readable medium containing a computer program may comprise computer program code means adapted to control a lighting system to perform all the steps of the methods as claimed in claim 10 when the program is run on the physical computing device coupled to the lighting system.

* * * * *